US004001652B2

United States Statutory Invention Registration [19]

[11] Reg. Number: H1652

Kormelink et al.

[45] Published: Jun. 3, 1997

[54] STABILIZED POLYMER COMPOSITIONS COMPRISING ONE OR MORE LUBRICATING ADDITIVES

[75] Inventors: Hendrik G.-J. Kormelink; Arie Kramer, both of Amsterdam, Netherlands

[73] Assignee: Shell Oil Company, Houston, Tex.

[21] Appl. No.: 128,928

[22] Filed: Sep. 29, 1993

[51] Int. Cl.[6] ..... C10M 105/50

[52] U.S. Cl. ..... 508/452; 508/577

[58] Field of Search ..... 252/56 R, 51.5 A

[56] References Cited

U.S. PATENT DOCUMENTS

| | | | |
|---|---|---|---|
| 3,652,411 | 3/1972 | Commichau | 252/52 A |
| 4,816,514 | 3/1989 | Lutz | 525/55 |
| 5,079,340 | 1/1992 | Auerbach et al. | 528/392 |
| 5,082,402 | 1/1992 | Gaku et al. | 252/52 A |

FOREIGN PATENT DOCUMENTS

| | | |
|---|---|---|
| 0326224A2 | 8/1989 | European Pat. Off. . |
| 0450695A1 | 10/1991 | European Pat. Off. . |
| 0453010A1 | 10/1991 | European Pat. Off. . |

*Primary Examiner*—Donald P. Walsh
*Assistant Examiner*—Anthony R. Chi

[57] ABSTRACT

It is herein disclosed a composition comprising a major amount of polymers of carbon monoxide and one or more ethylenically unsaturated compounds and a minor amount of one or more external lubricating additives having an average molecular weight of at least 500. The composition may further comprise an internal lubricating additive. The inventive compositions have and exhibit improved stability properties.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STABILIZED POLYMER COMPOSITIONS COMPRISING ONE OR MORE LUBRICATING ADDITIVES

Background of the Invention

The invention relates to copolymer compositions comprising a major amount of a copolymer of carbon monoxide with one or more ethylenically unsaturated compounds and a minor amount of one or more lubricating additives.

Copolymers of carbon monoxide and one or more ethylenically unsaturated compounds are known. In these copolymers the units originating from carbon monoxide substantially alternate with the units originating from the ethylenically unsaturated compounds. In copolymers, wherein the units originating from ethylenically unsaturated compounds are derived from different unsaturated compounds (A,B...), the carbon monoxide originating units alternate with units originating from A,B,... such that usually among the units originating from ethylenically unsaturated compounds the units derived from A,B... etc. are randomly distributed.

The copolymers may be prepared by one of the methods described in the art. These methods generally consist of reacting the monomers, i.e., carbon monoxide and the ethylenically unsaturated compound(s), under polymerization conditions in the presence of a suitable catalyst.

A convenient preparation method is described in EP 181014. According to this method the monomers are copolymerized in the presence of a catalyst comprising a Group VIII metal selected from palladium, cobalt and nickel, preferably palladium, an anion of a carboxylic acid with a pKa lower than 2 and a bidentate ligand comprising two phosphorus, arsenic or antimony atoms.

The copolymers obtained according to this, or a similar preparation method, are relatively high molecular weight compounds, having utility as thermoplastics for sheets, fibers or films, and may be used for the manufacturing of packaging materials for foods and drinks, for the production of structural articles and parts for the car industry and for various applications in the domestic sphere. Typical for the copolymers is their high melting point, usually of 200° C. or more. Although this is of value for many applications such as the aforesaid production of shaped articles and car parts, in some instances the high melting point of the copolymers is undesirable.

It will be appreciated that during melt processing of the copolymers, e.g. for fiber or sheet applications, and for injection molding applications, the copolymers have to be subjected to high temperatures in view of their high melting points.

At these high temperatures, the melt tends to become sticky and hence adheres strongly to the surfaces of the equipment thus adversely affecting the processability of the melt. Also, at the said high temperatures, chemical changes may occur to a significant extent, causing crosslinking and formation of degradation products, which generally has a negative effect on the physical and mechanical properties of the melt. For example, in melt extrusion, the said chemical changes will result in a substantial increase in viscosity, as a function of residence time. The removal of built-up heat will become more difficult and a reduction in melt stability usually occurs.

Various attempts have been made with the purpose of improving the melt flow properties of the copolymers. Thus, it has been proposed to add one or more stabilizers to the melt in order to reduce in the final product, formation of amorphous polymer material and to minimize a loss in crystallinity. Examples of suitable stabilizers in this respect are aluminum compounds such as aluminum trialkoxides and hydrolysis products thereof.

Significant improvements in the flow properties of the copolymers have been achieved by adding lubricating additives to the melt. A class of suitable additives, disclosed in EP 453010, consists of compounds of the general formula X $(R)_n$, wherein X represents an n valent polar moiety comprising 1–4 polar groups, where n is 2, 3 or 4 and each R, independently, represents a monovalent hydrocarbyl radical having 5 to 30 carbon atoms which is attached to a polar group. Examples of suitable representatives of this class of lubricating additives are N,N'-bisamides of ethylene diamines, glycerol 1,3-diesters, glycerol triesters and diesters of 2,2'-bis(4'-hydroxyphenyl) propane.

Lubricating additives of the aforesaid class come into the category of internal lubricants, i.e. lubricants with a high degree of compatibility with the molecules in the melt and which, owing to their lubricating properties, reduce the friction within the melt and reduce the viscosity increase when the melt is held under shear, e.g., during melt extrusion.

It has also been tried to improve the melt flow properties of the copolymers by addition of an external lubricating additive, i.e. a compound which is to a much lesser degree compatible with the melt, but which has lubricating properties at the interface of the melt and the (metal) surfaces of the processing equipment. However, these trials have been unsuccessful. It has been observed that the addition of compounds, known as suitable external lubricating additives for polyolefins, e.g. waxes, does not have any favorable effect on the melt flow properties of the copolymer melts of the present application.

Although a certain slip between melt and equipment surface is considered desirable, it is believed that the external lubricating additives so far investigated, causes the formation of an actual slipping layer between the copolymer melt and the equipment surfaces, as a result of which the copolymer melt becomes unprocessable.

It has now been found that certain compounds can be used as external lubricating additives, which effectively prevent sticking of the copolymer melt to the surfaces of the processing equipment, without having an adverse effect on the processability of the melt.

The invention may be defined as relating to copolymer compositions comprising a major amount of copolymers of carbon monoxide and one or more ethylenically unsaturated compounds and a minor amount of one or more external lubricating additives having an average molecular weight of at least 500.

Without wishing to be bound by any theory, it is believed that owing to the relatively high molecular weight of the lubricating additives of the invention, their compatibility with the copolymers in the melt is somewhat better than that of external lubricating additives of lower molecular weight. This apparently leads to a reduction both in viscosity of the melt and in friction between melt and equipment surface, without impairing the processability of the melt. Although there is no strict upper limit for the molecular weight of the lubricating additives of the invention, it is clear that the handling of an additive and, in particular, its incorporation into the copolymer composition, will be more difficult if the additive chosen has an extremely high molecular weight.

Preference is therefore given to lubricating additives of which the average molecular weight is less than 10,000. Most preferred are lubricating additives with an average molecular weight in the range of 1000 to 9000.

As may be expected, apart from their average molecular weight, the molecular structure of the lubricating additives also affects the melt flow properties of the copolymer compositions. A very suitable class of lubricating additives is long-chain hydrocarbons modified with one or more polar groups. It is considered likely that the long chains in the molecules of these compounds provide a lubricating activity at the interface of the melt and the surface of the equipment during melt processing and that the presence of polar groups reduces the non-compatibility of these compounds with the copolymers in the compositions of the invention, which leads to a reduction in viscosity of the melt.

The hydrocarbon chain in these compounds typically consists of more than 30 carbon atoms. The polar groups may be oxygen-containing moieties such as hydroxyl, formyl, acyl, keto or carboxy groups or nitroso or sulfoxy groups. The polar group(s) may be located terminally or may be attached to nonterminal carbon atoms in the chain. Preferably the amount of polar groups per molecule is selected such that the oxygen content in the lubricating additive is less than 25% by weight.

Preferred compounds to be incorporated in the copolymer compositions of the invention are polyolefins, such as polyethene and polypropene, modified with one or more oxygencontaining moieties. Compounds of this category may be conveniently obtained by oxidizing the said polyolefins, whereby some chain-scission may occur and smaller molecules having one or more oxygen-containing end groups may be formed.

Preferred compounds consist of commercially available oxidized polyolefins, in particular an oxidized polyethene having a molecular weight of 6000 and an acid number of 16 mg KOH/g. Other preferred lubricating additives for the compositions of the invention comprise copolymers of olefins such as ethene and unsaturated esters, such as vinylacetate.

A suitable example is a commercially available copolymer of ethene with 10% of vinyl acetate, the copolymer having a molecular weight of 6500.

Another suitable lubricating additive is hydrated recinusoil, having a molecular weight of 938. This additive is in particular recommended, if the composition comprises also one or more pigments. It has moreover been found that a further improvement in melt flow properties of the compositions of the invention is achieved by the additional presence in the compositions of one or more internal lubricating additives. Surprisingly, the resulting improvement considerably exceeds the combined improvements observed when either the external or the internal lubricating additive is solely incorporated in the composition.

A strong synergistic effect is observed if as internal lubricating additive a compound of one of the general formulae $Y(NR'—C(O)—R)_n$ and $Y(C(O)—NR'—R)_n$ is added, in which formulae Y represents an n valent alkyl radical having up to 6 carbon atoms, R' is hydrogen or an alkyl group with up to 4 carbon atoms, R represents a substituted or non-substituted hydrocarbyl radical having from 5 to 30 carbon atoms and n is 2, 3 or 4.

Preferred internal lubricating additives are compounds of the aforesaid formulae wherein Y represents an n valent alkyl radical having up to 4 carbon atoms, R' is hydrogen, R represents a substituted or non-substituted alkyl group having from 8 to 20 carbon atoms and up to two ethylenically unsaturated linkages and n is 2 or 3.

Typical examples of suitable internal lubricating additives are N,N'-dilinoleylsuccinamide, N,N'-dimethyl-N,N'-dimyristoyltrimethylenediamine, N,N'-diethyl-N,N'-dioleyltetramethylenediamine, N,N'-dipalmitylsuccinamide, N,N'-dimethyl-N,N'-dicetyl-succinamide, N,N'-dilauroyltrimethylenediamine and N,N'-distearoylethylenediamine.

A significant synergistic effect on the melt flow properties, in particular as regards a reduction in viscosity without adverse effect on the melt stability, has been observed when the copolymer compositions of the invention comprise N,N'-distearoylethylene diamine.

The amount of lubricating additives in the compositions may vary within the range indicated as a minor amount, of which the upper limit is unlikely to exceed 40 wt %. Generally the total amount of external and internal lubricating additives is less than 10 wt % based on the weight of the composition. Preferably, the amount of lubricating additives is in the range of from 0.05 to 3 wt %, most preferably in the range of from 0.1 to 1 wt %, on the same basis.

The molar ratio between external and internal lubricating additives is not critical, but is preferably selected in the range of 0.05 to 2.2

If desired, in addition to the lubricating additive(s), the compositions of the invention may comprise one or more further additives, such as additives for improving oxidative stability and/or UV stability. Such additives may be selected from the group consisting of stearically hindered phenolic compounds, for example 2,5-alkylphenols, copolymers of ethylene and acrylic acid or methacrylic acid, aromatic amines, for example 4,4'-bisbenzyl diphenylamine or aluminum hydroxides, for example bayerite. Moreover, the compositions may comprise one or more pigments, the presence of which may be desirable for specific applications, for example automotive parts.

The invention also relates to a method for improving the flow properties of copolymers of carbon monoxide with one or more ethylenically unsaturated compounds, comprising the addition of a minor amount of one or more external lubricating additives having an average molecular weight of at least 500 and optionally also of one or more internal lubricating additives.

The external lubricating additive(s) may be introduced into the processing equipment in various ways. A convenient procedure consists in admixing the external lubricating additive(s) and, if present, also the internal lubricating additive(s) with the copolymers before these are introduced in the processing equipment.

If desired, the lubricating additives may be added to the copolymers after these have been charged to the processing equipment. The compositions of the invention comprise a major amount of copolymers of carbon monoxide and one or more ethylenically unsaturated compounds. As ethylenically unsaturated compounds are in particular recommended compounds consisting exclusively of carbon and hydrogen. If desired, ethylenically unsaturated compounds which in addition comprise one or more heteroatoms may be used as monomer in the preparation of copolymers with carbon monoxide, for example unsaturated esters such as vinylacetate or allylacetate. Preferred monomers are unsaturated hydrocarbons.

Suitable unsaturated hydrocarbons include lower olefins such as ethene, propene, butene-1, aromatic compounds such as styrene and alpha-methyl styrene and cyclic olefins such as cyclopentene. In particular, preferred are ethene and a mixture of ethene and propene. From these monomers (by reaction with carbon monoxide), ethene-carbon monoxide copolymers and ethene-propene-carbon monoxide terpolymers, respectively, are prepared. As has been explained above, in the said ethene/carbon monoxide copolymers the units originating from carbon monoxide substantially alternate with those originating from ethene and in the said ethene/propene/carbon monoxide terpolymers the units originating from carbon monoxide substantially alternate with the - randomly distributed units originating from ethene and propene.

Typically, the copolymers participating in the compositions of the invention, have a relatively high intrinsic viscosity, or limiting viscosity number (LVN). Preferred compositions comprise copolymers of which the LVN is in the range of 1.0 to 2.5 dl/g, measured at 60° C. in m-cresol.

The bulk density of the copolymers present in the compositions is not critical, but for most applications copolymers are selected having a bulk density of at least 0.2 g/1.

The invention is further illustrated by the following examples.

EXAMPLE 1

A copolymer composition was prepared by dry blending of a terpolymer of carbon monoxide ethene and propene in the form of a powder, having a melting point of 220° C. and a limiting viscosity number (LVN) of 1.8 dl/g (measured in m-cresol at 60° C.), 0.5% by weight of an antioxidant (2.6-di-t.butyl-4-methyl phenol) and 0.5% by weight of the lubricating additive(s) to be investigated.

The equipment used was a commercial torque rheometer (Brabender plasticoder with mixing head, type W 50 E), equipped with roller blades. This is a well-known instrument for measuring the torque, necessary to apply a constant shear regime in a thermostatically heated mixing chamber. An amount of 55 grams of the copolymer composition was charged to the mixing chamber of the rheometer. The spindle speed was set at 50 rpm, the temperature of the mixing chamber at 240° C.

Measurements were made of the initial torque increase (slope) which is indicative of the crosslinking rate, of the time to maximum torque which is proportional to the degradation time, of the maximum attainable torque level which relates to the friction between the copolymer, the maximum temperature measured in the melt which indicates the heat generated, and the inner surface of the equipment and of the polymer adhesion on the rotor blades, showing whether or not effective prevention of sticking has been achieved. The results obtained are represented in Table 1.

TABLE 1

| Lubricating Additive | Slope (Nm/h) | Time to max. torque (min) | T max. (°C.) | Maximum torque level (Nm) | Polymer material on rotor blades |
|---|---|---|---|---|---|
| — | 10.8 | 84.6 | 363 | 43.6 | yes |
| A* | 7.2 | 116 | 262 | 42.4 | yes |
| 1 | 10.8 | 88 | 253 | 36.8 | no |
| 2 | 9.6 | 93.2 | 252 | 37.2 | no |
| 3 | 6.0 | 130.4 | 252 | 34.4 | no |
| 4 | 6.0 | 142.4 | 252 | 33.2 | no |

*not according to the invention.
A a commercially available (ex Hoechst) amide wax of the bis-stearoyl-ethylenediamine type with an acid value of 6 mg. KOH/g.
1 a commercially available polar polyethylene wax with an average molecular weight of 6000 and an acid value of 16 mg KOH/g (ASTM D1386), (Wax PED. 191, ex Hoechst).
2 a commercially available (ex BASF) copolymer of ethene with 10% vinylacetate with an average molecular weight of 6500 (LUWAX-EVA 2, ex BASF).
3 0.5 wt % of 1 and 0.5% w of A.
4 0.5 wt % of 2 and 0.5% w of A.

EXAMPLE 2

Melt processability of a carbon monoxide-etheneprepene copolymer composition was further investigated in an extrusiometer. As copolymer composition the composition described in Example 1 was used, the amount of each lubricating additive, however being 0.25 wt % instead of 0.2 wt %. The equipment used was a Brabender Plasticorder equipped with a single screw extruder, having a diameter (D) of 19 mm and a length of 25D.

Temperature settings, from mixing chamber to die, were 245, 250, 260 and 265° C. Measurements were made of die pressures at extruder screw speeds of 20, 40, 60, rpm.

A lower pressure increase, resulting from each increase in screw speed, indicates a better lubricating performance of the extruded copolymer composition.

The pressure values in bars are shown in Table 2A.

TABLE 2A

| Screw Speed (rpm) | 20 | 40 | 60 | 80 | 100 |
|---|---|---|---|---|---|
| Lubricating additive | | | | | |
| — | 18 | 26 | 35 | 42 | 47 |
| A'* | 17 | 23 | 29 | 35 | 42 |
| 1' | 13 | 20 | 22 | 23 | 27 |
| 3' | 14 | 18 | 22 | 23 | 24 |

The torque values in Nm are shown in Table 2B.

TABLE 2B

| Screw speed (rpm) | 20 | 40 | 60 | 80 | 100 |
|---|---|---|---|---|---|
| Lubricating additive | | | | | |
| — | 14 | 20 | 33 | 42 | 88 |
| A'* | 15 | 17 | 20 | 26 | 35 |
| 1' | 22 | 27 | 32 | 39 | 37 |
| 3' | 7 | 8 | 9 | 10 | 11 |

*not according to the invention
A' 0.25 wt % of A (cf Example 1).
1' 0.25 wt % of 1 (cf Example 1).
3' 0.25 wt % of 1 and 0.25 wt % of A (cf Example 1).

EXAMPLE 3

In an Instron/Instrumat capillary rheometer, apparent viscosities, as a function of shear stress was measured at a temperature of 240° C., were determined of a lubricating additive free and three lubricating additive containing carbon monoxide-ethene-propene copolymer compositions, viz compositions A',1', and 3' (cf Example 2 ). Two capillaries of different length/diameter ratios were used, in order to correct for capillary entrance and barrel effects:

| diameter (mm) | length (mm)/diameter (mm) |
|---|---|
| 1.27 | 39.7 |
| 1.26 | 10.2 |

The standard test procedure was as follows: the period of thermal conditioning was started 30 seconds after beginning to fill the barrel with 15 g of material; after 4 minutes when the material was considered to be in thermal equilibrium, the amount of material in the barrel was reduced to a height of 210 mm above the top of the capillary; for each shear rate viscosity measurements were made at a residence time of 5 minutes. Since degradation of the composition in the melt phase results in a rise of apparent viscosity as a function of time, a rise in force is observed as the experiment progresses. The force required to calculate the apparent viscosity and shear stress is therefore taken at a single point in the middle of the measurement period of 5 minutes.

The results, corrected for capillary losses (Bagley correction) and for non-Newtonian flow in the capillary (Rabinowitsch correction) are shown in Table 3.

TABLE 3

| Apparent Viscosity at 240° C. (Pa · s) | | | | |
|---|---|---|---|---|
| Shear Stress (kPa) | Blank | A' | 1' | 3' |
| 10 | 3000 | 2410 | 2800 | 2170 |
| 20 | 2210 | 1920 | 1580 | 1240 |
| 50 | 1050 | 1040 | 720 | 340 |
| 100 | 700 | 580 | 400 | 250 |

While this invention has been described in detail for the purpose of illustration, it is not to be construed as limited thereby but is intended to cover all changes and modifications within the spirit and scope thereof.

What is claimed is:

1. A copolymer composition comprising a major amount of polymer of carbon monoxide and one or more ethylenically unsaturated compounds, a minor amount of one or more internal lubricating additives, and a minor amount of one or more external lubricating additives having an average molecular weight of at least 500.

2. A composition as in claim 1 wherein said additives have an average molecular weight of from about 1,000 to 10,000.

3. A composition as in claim 1 wherein said lubricating additive substantially consist of long-chain hydrocarbons, modified with one or more polar groups.

4. A composition as in claim 1 wherein said the lubricating additives substantially consist of polyolefins modified with one or more oxygen-containing moieties.

5. A composition as in claim 4, wherein in said lubricating additive the oxygen content is less than 25% by weight.

6. A composition as in claim 4 wherein said additives comprise an oxidized polyethylene.

7. A composition as in claim 4 wherein said lubricating additive comprises copolymer of ethene with vinylacetate.

* * * * *